United States Patent
Strahan et al.

(10) Patent No.: US 10,786,969 B1
(45) Date of Patent: Sep. 29, 2020

(54) FIRE RESISTANT SUPPORT ARTICLE

(71) Applicant: Milliken & Company, Spartanburg, SC (US)

(72) Inventors: Jeffrey Strahan, Greer, SC (US);
Sumit Phalak, Spartanburg, SC (US);
Will Ringo, Spartanburg, SC (US);
Brandon Roberts, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 133 days.

(21) Appl. No.: 16/013,325

(22) Filed: Jun. 20, 2018

Related U.S. Application Data

(60) Provisional application No. 62/556,097, filed on Sep. 8, 2017.

(51) Int. Cl.
| | |
|---|---|
| *B32B 5/26* | (2006.01) |
| *B32B 5/02* | (2006.01) |
| *B32B 7/12* | (2006.01) |
| *A47C 31/00* | (2006.01) |

(52) U.S. Cl.
CPC ............ *B32B 5/022* (2013.01); *A47C 31/001* (2013.01); *B32B 7/12* (2013.01); *B32B 2307/3065* (2013.01)

(58) Field of Classification Search
CPC .. B32B 5/26; B32B 5/022; B32B 7/12; B32B 2262/04; B32B 2307/722; B32B 2307/3065
USPC .............. 442/136, 165, 414, 381; 428/304.4, 428/311.71, 311.91, 508, 920, 921
See application file for complete search history.

(56) References Cited

U.S. PATENT DOCUMENTS

| | | | | |
|---|---|---|---|---|
| 5,079,074 | A | * | 1/1992 | Steagall .................... B32B 5/26 428/218 |
| 7,157,137 | B2 | | 1/2007 | Wenstrup ....................... 428/218 |
| 7,229,938 | B2 | | 6/2007 | Wenstrup et al. ............ 442/415 |
| 7,238,633 | B1 | * | 7/2007 | Kaylor ................. A47C 27/121 442/218 |
| 7,259,117 | B2 | | 8/2007 | Mater et al. ................... 442/414 |
| 7,326,664 | B2 | | 2/2008 | Hartgrove et al. ........... 442/414 |
| 7,365,033 | B1 | | 4/2008 | Murphy et al. ............... 442/302 |
| 7,484,256 | B2 | | 2/2009 | Murphy et al. .................... 5/698 |
| 7,816,287 | B1 | | 10/2010 | Hartgrove ..................... 442/136 |
| 2007/0232176 | A1 | * | 10/2007 | Cashin ................. A47C 31/001 442/381 |

(Continued)

OTHER PUBLICATIONS

"Hollow Conjugated Polyester Staple Fiber," Textile Products, Apr. 27, 2013. (Year: 2013).*

*Primary Examiner* — Matthew D Matzek
(74) *Attorney, Agent, or Firm* — Cheryl J. Brickey

(57) ABSTRACT

Disclosed is a support article containing a first non-woven layer and a second non-woven layer. The first non-woven layer contains a blend of fibers of about 15-70% by weight fire resistant (FR) rayon fibers, 10-30% by weight hollow conjugated siliconized fibers, and 20-40% by weight binder fibers. The second non-woven layer contains a blend of FR rayon fibers, hollow conjugated siliconized fibers, and binder fibers. The amount of FR rayon fiber is within 15 percentage points of the weight percentage of FR rayon fiber in the first non- woven layer. The lower surface of the first non-woven layer is adhered to the upper surface of the second non-woven layer. The density of the first non-woven layer is at least 10% less than the density of the second non-woven layer.

18 Claims, 1 Drawing Sheet

(56) References Cited

U.S. PATENT DOCUMENTS

2007/0293114 A1* 12/2007 Ogle .................... B32B 5/26
                                                         442/414
2008/0070465 A1   3/2008 Wiles ....................... 442/352
2010/0029163 A1*  2/2010 Ogle .................... B32B 5/26
                                                         442/414

* cited by examiner

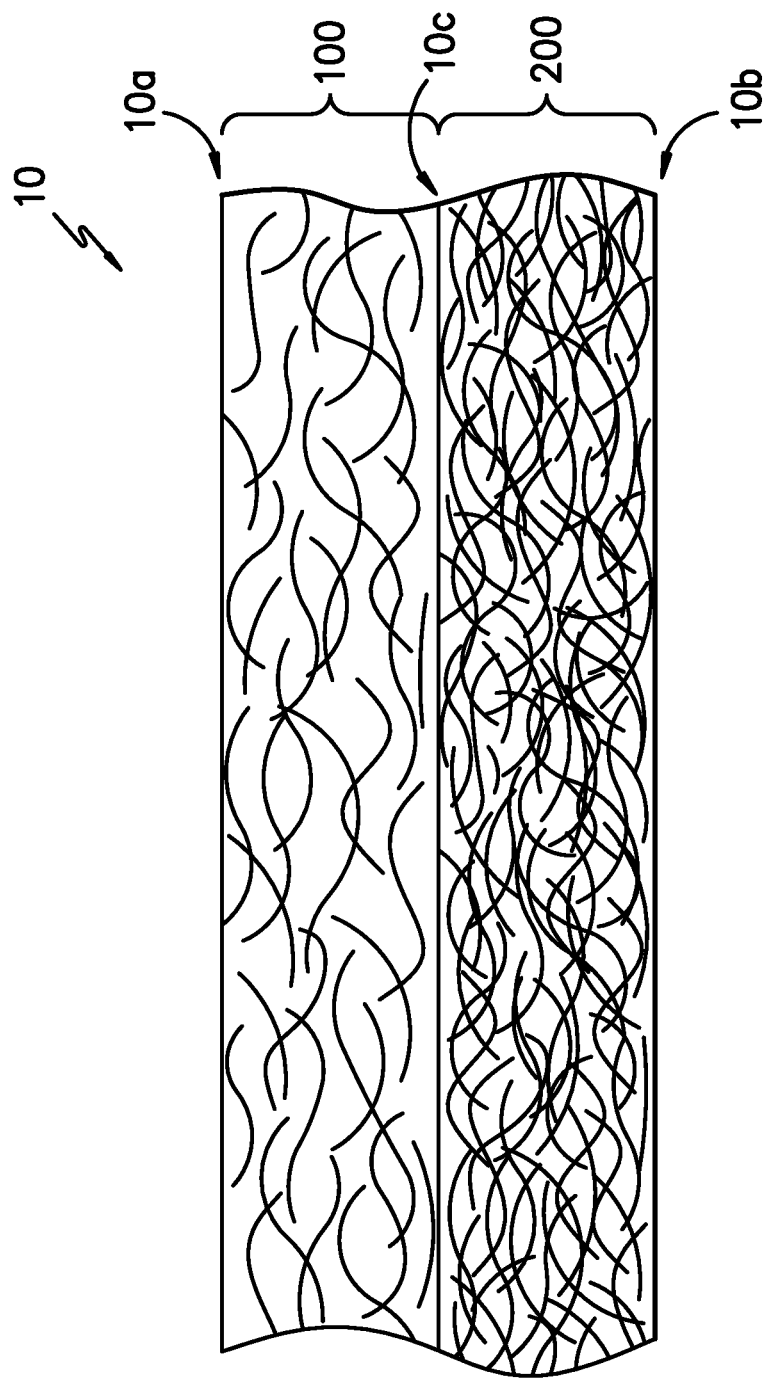

FIRE RESISTANT SUPPORT ARTICLE

RELATED APPLICATIONS

This application claims priority to provisional U.S. patent application 62/556,097 filed on Sep. 8, 2017 which is herein incorporated in its entirety.

TECHNICAL FIELD

The present disclosure relates generally to non-wovens used in support articles, more particularly to fire resistant support articles containing non-wovens.

BACKGROUND

There is heightened awareness of fire prevention in homes and businesses in the United States. This awareness has led to the development of standards and legislation directed to reducing the risk of fires, particularly with respect to bedding and upholstered furniture.

Conventional fire prevention techniques for bedding and upholstered furniture typically involve creating an FR barrier around the support article using either topical application and inherent solutions. Topical treatments involve directly applying flame retardant chemicals to an outer decorative layer of upholstery material. Inherent solutions involve materials that are in and of themselves FR; common materials would be glass and aramid polymers. Both function as a barrier layer which serves to thermally protect the inside portion of the support article. Without such a barrier layer, the highly flammable core contents of the support article will ignite and fail industry FR tests such as 16 CFR 1633. In today's market, FR nonwovens and FR knits are used to provide protection against fire. These nonwovens are usually made up of FR rayon (65-80%) and binder fiber (20-35%) and they are used to cover the mattress from top (under the tick). Similarly, this same nonwoven material is used to protect the mattress from sides. FR knits are an expensive alternative, which are used to cover the entire mattress below the tick. These technologies focus on creating a FR barrier around the outside of the support article to protect the flammable center of the article. There remains a need to create a FR support article that is itself FR and therefore does not need additional FR surrounding layers.

BRIEF SUMMARY

Disclosed is a support article having a first side and a second side and containing a first non-woven layer and a second non-woven layer. The first non-woven layer has an upper and lower surface and contains a blend of fibers of about 15-70% by weight fire resistant (FR) rayon fibers, 10-30% by weight hollow conjugated siliconized fibers, and 20-40% by weight binder fibers. The second non-woven layer has an upper and lower surface and contains a blend of FR rayon fibers, hollow conjugated siliconized fibers, and binder fibers. The amount of FR rayon fiber is within 15 percentage points of the weight percentages of FR rayon fiber in the first non-woven layer. The lower surface of the first non-woven layer is adhered to the upper surface of the second non-woven layer. The density of the first non-woven layer is at least 10% less than the density of the second non-woven layer.

BRIEF DESCRIPTION OF THE FIGURES

An embodiment of the present invention will now be described by way of example, with reference to the accompanying drawings.

FIG. 1 is a schematic view of one embodiment of the fire resistant support article.

DETAILED DESCRIPTION

The support article of the disclosure has the advantage that the non-woven layers are fire resistant (FR) and therefore may not need the traditional barrier and other FR surroundings, textiles, and films to enable the support article to pass standard fire tests.

FIG. 1 shows one embodiment of a FR support article 10. The FR support article 10 has a first side 10a and a second side 10b. Preferably, the support article 10 is oriented such that the first side 10a faces a user of the support article. The support article 10 contains a first non-woven layer 100 and a second non-woven layer 200. In one embodiment, the thickness of the article 10 (defined to be the distance between the upper surface of the first non-woven layer 100 and the lower surface of the second non-woven layer if there are two non-woven layers) is between about 1 and 5 inches. If more than two non-woven layers were used the thickness of the article would preferably be between 1 and 20 inches, more preferably between 2 and 10 inches. Where the two non-woven layers 100, 200 meet and are attached is defined as 10c. The first non-woven layer 100 has upper and lower surfaces, the upper surface facing the first side of the support article 10 and the lower surface facing the second non-woven layer 200. The second non-woven layer 200 has upper and lower surfaces, the lower surface facing the second side of the support article 10 and the lower surface facing the first non-woven layer 100. The first and second non-woven layers 100, 200 preferably comprise a plurality of staple fibers.

In one embodiment, the first non-woven layer 100 is formed by air laying the fibers. In general, the staple fibers are blended, opened, carded, and then air laid to form an initial fabric. This fabric is heated in an oven with a compression belt. The heat provided by the oven at least partially melts the binder fiber, thereby increasing the rigidity of the fabric upon cooling. Preferably, the first non-woven layer has an areal weight of between about 1 and 4 ounces per square foot (osf), more preferably between about 1.5 and 2.5 osf. Preferably, the first non-woven layer has a density of between about 0.75 and 2.5 pounds per cubic foot (lb/cf). Preferably, the first non-woven layer has an average thickness (defined to be the distance between the upper and lower surfaces of the first non-woven layer) of between about 1 and 3 inches.

Preferably, the first non-woven layer 100 contains a blend of fibers of about 15-70% by weight fire resistant (FR) rayon fibers, 10-30% by weight hollow conjugated siliconized fibers (HCS), and 20-40% by weight binder fibers.

Preferably, first non-woven layer 100 contains a blend of fibers of about 15-70% wt FR rayon fibers. In another embodiment, the FR rayon fibers are in an amount between about 20 and 35% wt of the first non-woven layer 100.

Rayon is a regenerated cellulosic fiber. With addition of silica during the fiber making process, FR properties can be added to the rayon. FR rayon is preferred in this invention due to its ability to form a robust char upon exposure to fire. The silica acts as both a heat sink and prevents the normal melt drip behavior of polyester (PET), polypropylene (PP), polyethylene (PE), and the like.

FR rayon is preferred over several other FR fibers for many reasons. FR rayon is preferred over modacrylics as modacrylics tend to shrink in a flame front and do not form a robust char like FR Rayon. Aramid fibers such as Kevlar and Nomex are much more expensive than FR Rayon and do not form a robust char like FR Rayon.

A commercially available FR barrier used in the market today is a high loft nonwoven with 80% FR Rayon and 20% PET as a binder. The high amount of FR rayon is necessary due to the fabric's thickness and density (0.8 osf/ 0.6 lb/cf). The overall function of this material is also fundamentally different than the current invention. Current materials need to provide enough thermal and FR protection to be a FR barrier to the foam and other highly flammable materials that make up typical support articles. In this claimed invention, the support article itself does not need an FR barrier because the non-woven layers of the support article are FR. Due to the weight, density, and thickness of the current invention, a surprisingly small amount of FR Rayon can be incorporated in the non-woven layers.

In one embodiment, the hollow conjugated siliconized fibers are in an amount of between about 10 and 30% wt of the first non-woven layer 100. In another embodiment, the HCS fibers are in an amount between about 15 and 25% wt of the first non-woven layer 100.

HCS fibers are hollow, meaning the cross section has a void section in the center of the fiber. Conjugated means that the fibers are twisted such that they behave like a spring, and siliconized means a topical silicone is applied to the already formed fiber. The HCS fibers provide a comfortable feel to the resulting support article. Upon compression, the support article bounces back and recovers much like a foam. There is preferably little to no permanent deformation like there can be with the 80/20 product mentioned previously. Additionally, the support article may have a much firmer feel than typical polyurethane foam. This was quantified by ASTM 3574, commonly referred to as Indentation Load Deflection (ILD) or Indentation Force Deflection (IFD). In this method a standard piece of material is compressed to 25% or 65% of its original thickness. Typical polyurethane foams have a linear response to the two tests; meaning the ratio of 65 to 25 is 2.6, and that is roughly the ratio that polyurethane and latex foams yield of their 65% and 25% ILDs. Due to the HCS fibers and the overall air-lay nonwoven process, the current invention's fabrics have 65% / 25% ILD ratios of 4-6.

Preferably, the HCS fibers are polyester fibers. Polyester (polyethylene terephthalate in particular) is preferred due to the physically and thermally robust properties of the fiber. PE and PP HCS fibers would melt and function as more as binder fibers in the preferred invention.

The binder fibers of the first non-woven layer 100 are fibers that form an adhesion or bond with the other fibers. Binder fibers can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the binder fibers are a polyester core and sheath fiber with a lower melt temperature sheath. Preferably, when the first non-woven layer 100 is heated and then cooled, the binder fibers remain as discernable fibers. In another embodiment, when the first non-woven layer 100 is consolidated, the binder fibers lose their fiber shape and form a coating on surrounding materials.

In one embodiment, the binder fibers are in an amount of between about 20 and 40% wt of the first non-woven layer 100. In another embodiment, the binder fibers are in an amount of less than about 40% wt of the first non-woven layer 100. In another embodiment, the binder fibers are in an amount between about 25 and 35% wt of the first non-woven layer 100. Binder fibers are necessary to ensure the fabric is physically robust enough to form a support article. Too high a loading of binder fibers may result in a stiffer non-woven layer.

In one embodiment, the first non-woven layer 100 contains additional fibers. Different synthetic fibers such as olefin fibers, polyesters (like Polyethylene terephthalate), Polybutylene terephthalate, Poly-1, 4 cyclohexylene-dimethylene terephthalate, acrylics, nylons, natural fibers (including cotton, wool, etc.), and elastomeric fibers (like fibers made from vistamax, hytrel, polyurethane etc.) with or without incorporated, coated or inherent FR properties. These fibers can have different cross-sections like round, oval, hollow, star, polygonal, square with voids, tri-lobal etc. These fibers can be recycled or virgin polymers.

Preferably, the first non-woven layer 100 contains hollow (H) polyester fibers. Preferably, the first non-woven layer 100 contains hollow conjugated polyester fibers. In the embodiment where the first non-woven layer comprises hollow conjugated polyester fibers, the layer 100 contains between about 5 and 50% by weight hollow conjugated (HC) polyester fibers, more preferably between about 10 and 35% by weight. In one embodiment, the amount of hollow PET fibers (including H, HC, and HCS) is between about 10 and 70% by weight. In one embodiment, this total weight percent is made up of between about 10 and 30% by weight HCS, between about 10 and 40% by weight HC and between about 10 and 40% by weight H.

The support article 10 also contains a second non-woven layer 200. In one embodiment, the second non-woven layer 200 is formed by the same method as the first non-woven layer 100. Preferably, the second non-woven layer has an areal weight of between about 1.5 and 6 osf and a density of between about 1 and 3.5 lb/cf. Preferably, the second non-woven layer has an average thickness (defined to be the distance between the upper and lower surfaces of the second non-woven layer) of between about 1 and 3 inches. Preferably, the second non-woven layer 200 has a density at least 10% (more preferably at least 15%, more preferably at least 20%) greater than the first non-woven layer (therefore the first non-woven layer 100 preferably has a density at least 10% (more preferably at least 15%, more preferably at least 20%) less than the second non-woven layer 200).

The second non-woven layer has an upper and lower surface and contains a blend of FR rayon fibers, HCS fibers, and binder fibers. The amount of FR rayon fiber is within 15 percentage points of the weight percentage of FR rayon fiber in the first non-woven layer. A percentage point is the unit for the arithmetic difference of two percentages. For example, moving up from 40% to 44% is a 4 percentage point increase, but is an actual 10 percent increase in what is being measured.

Preferably the first and second non-woven layers 100, 200 are oriented such that the lower surface of the first non-woven layer 100 faces the upper surface of the second non-woven layer 200 (forming locations 10c in the support 10). The non-woven layers 100, 200 (plus any additional non-woven layers) are preferably adhered together using an adhesive. Multiple techniques exist to adhere the two non-woven layers. Adhesives can be coated, sprayed, foamed, and generally applied to either or both layers followed by compressing the two layers for a short time to ensure proper adhesion. A preferred add-on weight would be between about 0.1% and 1.0% based on the weight of the upper nonwoven article. The articles could also be needled or stitched together.

The support article 10 may also contain a third non-woven layer. In one embodiment, the third non-woven layer is formed by the same method as the first non-woven layer 100. Preferably, the third non-woven layer has an areal weight of between about 3 and 9 osf and a density of between about 1.8 and 5 lb/cf. Preferably, the third non-woven layer has an average thickness (defined to be the distance between the upper and lower surfaces of the second non-woven layer) of between about 1 and 3 inches. Preferably, the third non-woven layer 200 has a density at least 10% (more preferably at least 15%, more preferably at least 20%) greater than the second non-woven layer (therefore the second non-woven layer 100 preferably has a density at least 10% (more preferably at least 15%, more preferably at least 20%) less than the third non-woven layer). The third non-woven layer has an upper and lower surface and contains a blend of FR rayon fibers, HCS fibers, and binder fibers. The amount of FR rayon fiber is within 15 percentage points of the weight percentage of FR rayon fiber in the first non-woven layer.

The support article 10 may be any suitable support article, preferably one that a user sits or lays down on. Some suitable support articles include mattresses, upholstered furniture, seating, pillows, cushions, pet beds, hospital beds, and the like. In one preferred embodiment, the support article is a mattress. The support article may also contain other additional non-woven layers, fabrics, and materials anywhere through the article 10 including above, below, between, or surrounding the non-woven layers 100, 200.

In one embodiment, the support article comprises an A surface, the A surface being defined as an outermost surface that a user sees and interacts with. In one embodiment, the A surface is a ticking. Typically, the ticking has an aesthetically pleasing surface design and a layer of quilted material for comfort. Ticking, in this application, is defined to mean the outermost layer of the bedding that the user interacts with and includes traditional ticking, knit fabrics, adhered fabrics, and zippered covers.

Preferably, the support article 10 passes the fire resistant test 16 CFR 1633. In this test a standard size mattress is exposed to two open flames thereby igniting the A surface or ticking. While the ticking is burning, the total heat release and heat release rate are analyzed. To pass 16 CFR 1633, the peak rate of heat release cannot exceed 200 kilowatts at any time within the 30 minute test. Additionally, the total heat release cannot exceed 15 megajoules for the first 10 minutes of the test. Additionally, it is preferably that the support article 10 also passes the 16 CFR 1632 test.

The example support article contained three non-woven layers. Each of the non-woven layers contained the same fiber blend at different densities. The fiber blend was 25% by weight FR rayon, 35% by weight low melt, 20% by weight HCS, and 20% by weight HC fiber. The top layer (the layer that would be the closest to the user) had an areal weight of 2 osf and a loft of 1 inch. The middle layer had an areal weight of 3.8 osf and a loft of 1.6 inches. The bottom layer had an areal weight of 5.3 osf and a loft of 1.6 inches.

The three non-woven layers were adhered together using a spray adhesive and then cut to roughly the size of a twin mattress (38"×75"). A common A surface ticking was adhered to all sides of the support article using a common spray adhesive.

The resulting support article was tested under 16 CFR 1633 conditions and passed the test.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A support article having a first side and a second side and comprising:
   a first non-woven layer having an upper and lower surface and comprising a blend of fibers of about 15-70% by weight fire resistant (FR) rayon fibers, 10-30% by weight hollow conjugated siliconized (HCS) fibers, and 20-40% by weight binder fibers;
   a second non-woven layer having an upper and lower surface and comprising a blend of FR rayon fibers, HCS fibers, and binder fibers, wherein the amount of FR rayon fiber is within 15 percentage points of the weight percentage of the FR rayon fiber in the first non-woven layer, wherein the lower surface of the first non-woven layer is adhered to the upper surface of the second non-woven layer, and wherein the density of the first non-woven layer is at least 10% less than the density of the second non-woven layer; and,
   a third non-woven layer having an upper and lower surface and comprising a blend of FR rayon fibers, HCS fibers, and binder fibers, wherein the amount of FR rayon fiber is within 15 percentage points of the weight percentage of the FR rayon fiber in the first non-woven layer, wherein the lower surface of the second non-woven layer is adhered to the upper surface of the third non-woven layer, and wherein the density of the second non-woven layer is at least 10% less than the density of the third non-woven layer.

2. The support article of claim 1, wherein the density of the first non-woven layer is at least 15% less than the density of the second non-woven layer.

3. The support article of claim 1, wherein the density of the first non-woven layer is at least 20% less than the density of the second non-woven layer.

4. The support article of claim 1, wherein the first non-woven layer comprising a blend of fibers of about 20-35% by weight fire resistant (FR) rayon fibers, 15-25% by weight HCS fibers, and 25-35% by weight binder fibers.

5. The support article of claim 1, wherein the amount of FR rayon fiber in the second non-woven layer is within 5 percentage points of the weight percentage of the FR rayon fiber in the first non-woven layer.

6. The support article of claim 1, wherein the first and second non-woven layers further comprise hollow polyester fibers.

7. The support article of claim 1, wherein the first and second non-woven layers further comprise hollow conjugated polyester fibers.

8. The support article of claim 1, wherein the HCS fibers are polyester fibers.

9. The support article of claim 8, wherein the polyester fibers are polyester terephthalate.

10. The support article of claim 1, wherein the binder fibers comprise low melt polyester.

11. The support article of claim 1, wherein the distance between the upper surface of the first non-woven layer and the lower surface of the second non-woven layer is between about 1 and 6 inches.

12. The support article of claim 1, wherein the areal weight of the first non-woven layer is between about 1 and 4 ounces per square foot (osf).

13. The support article of claim 1, wherein the areal weight of the second non-woven layer is between about 1.5 and 6 osf.

14. The support article of claim 1, wherein the areal weight of the third non-woven layer is between about 2 and 6 osf.

15. The support article of claim 1, wherein the support article is selected from the group consisting of a mattress, upholstered furniture, seating, and pet bed.

16. The support article of claim 1, wherein the support article passes 16 CFR 1633.

17. The support article of claim 1, wherein the support article further comprises an A surface.

18. The support article of claim 15, wherein the A surface is a ticking.

* * * * *